(No Model.) 5 Sheets—Sheet 2.
F. TAGGART.
APPARATUS FOR DISINTEGRATING GRAIN, &c.
No. 279,842. Patented June 19, 1883.
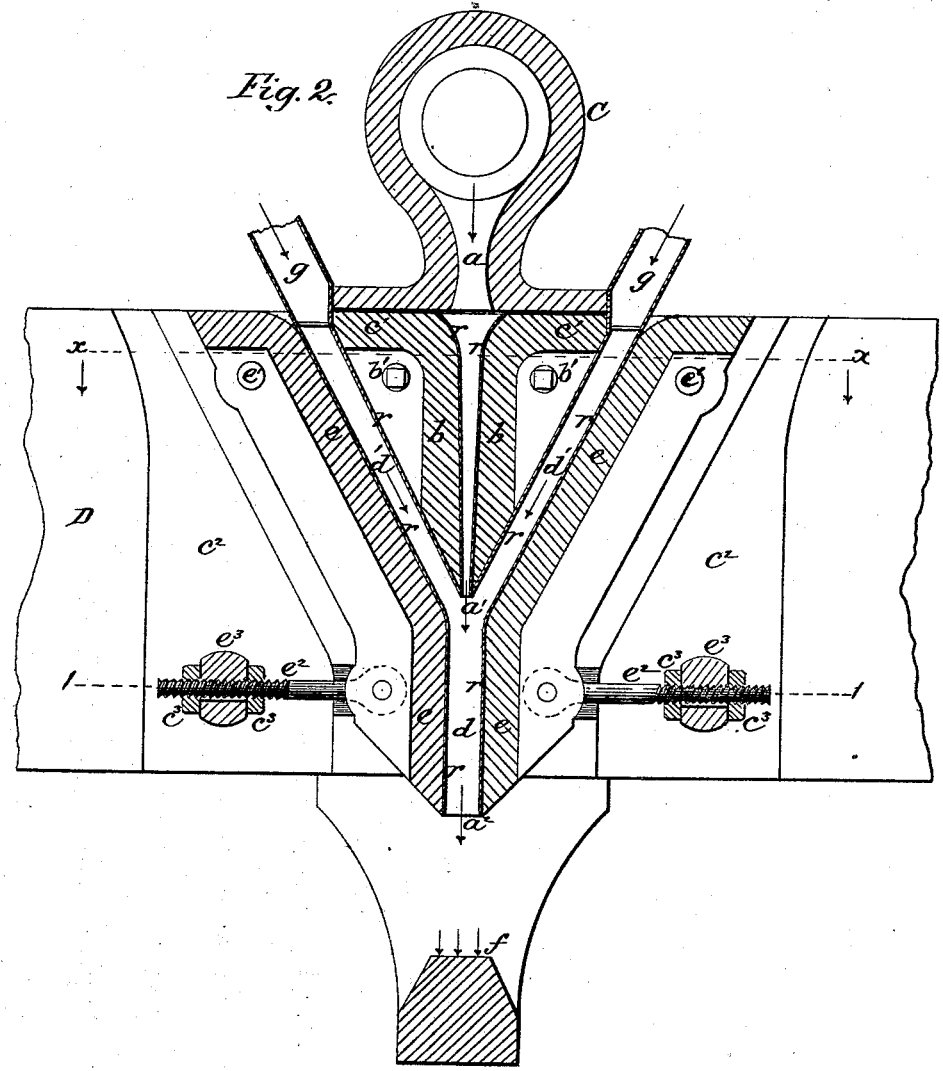
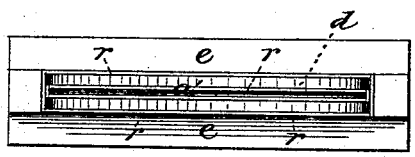
Witnesses:
Inventor:
pro Francis Taggart,
Johnson and Johnson
Attys (No Model.)  F. TAGGART.  5 Sheets—Sheet 3.

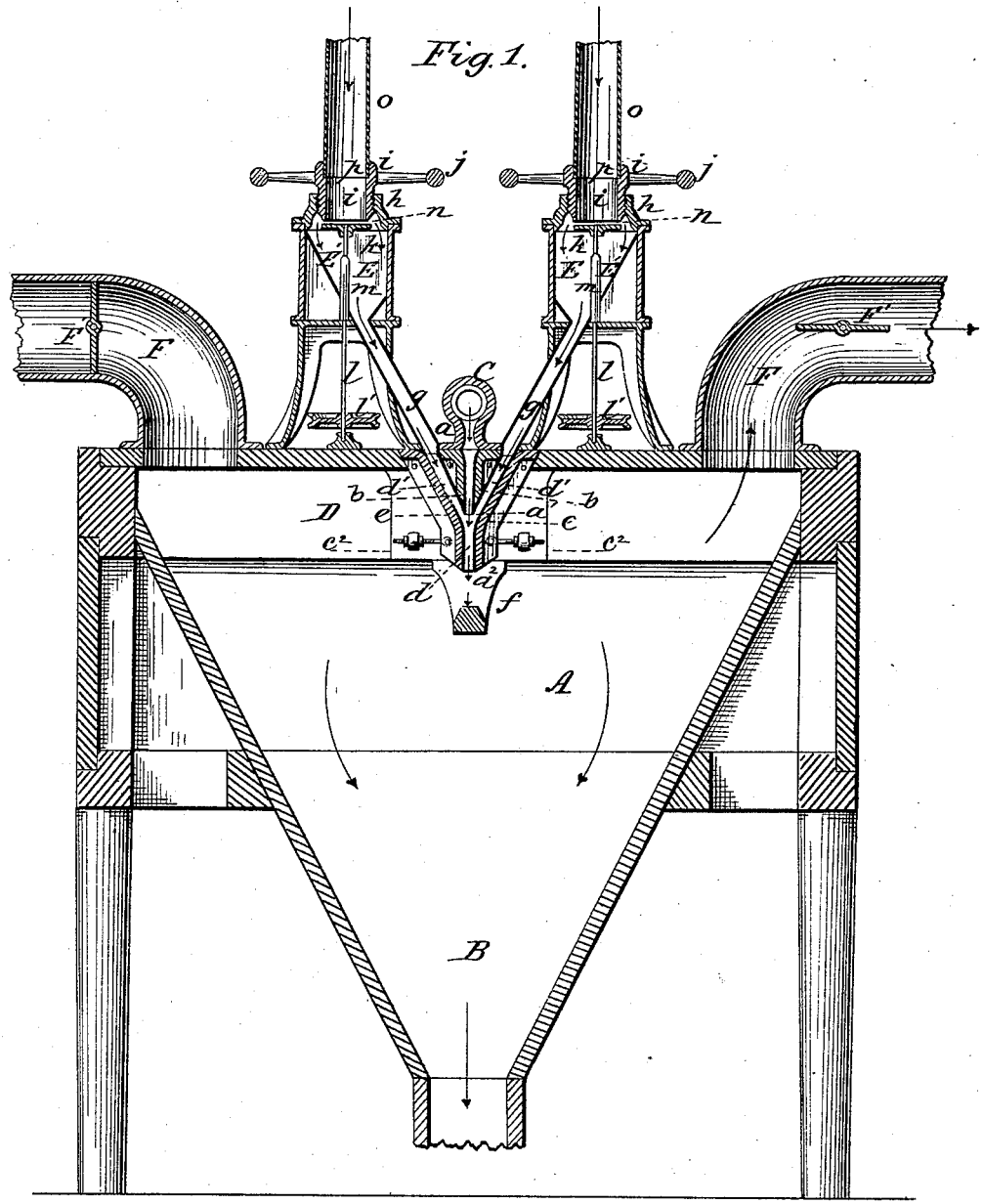

APPARATUS FOR DISINTEGRATING GRAIN, &c.

No. 279,842.  Patented June 19, 1883.

Witnesses:  
Inventor:  
pro Francis Taggart  
Johnson & Johnson  
Attys

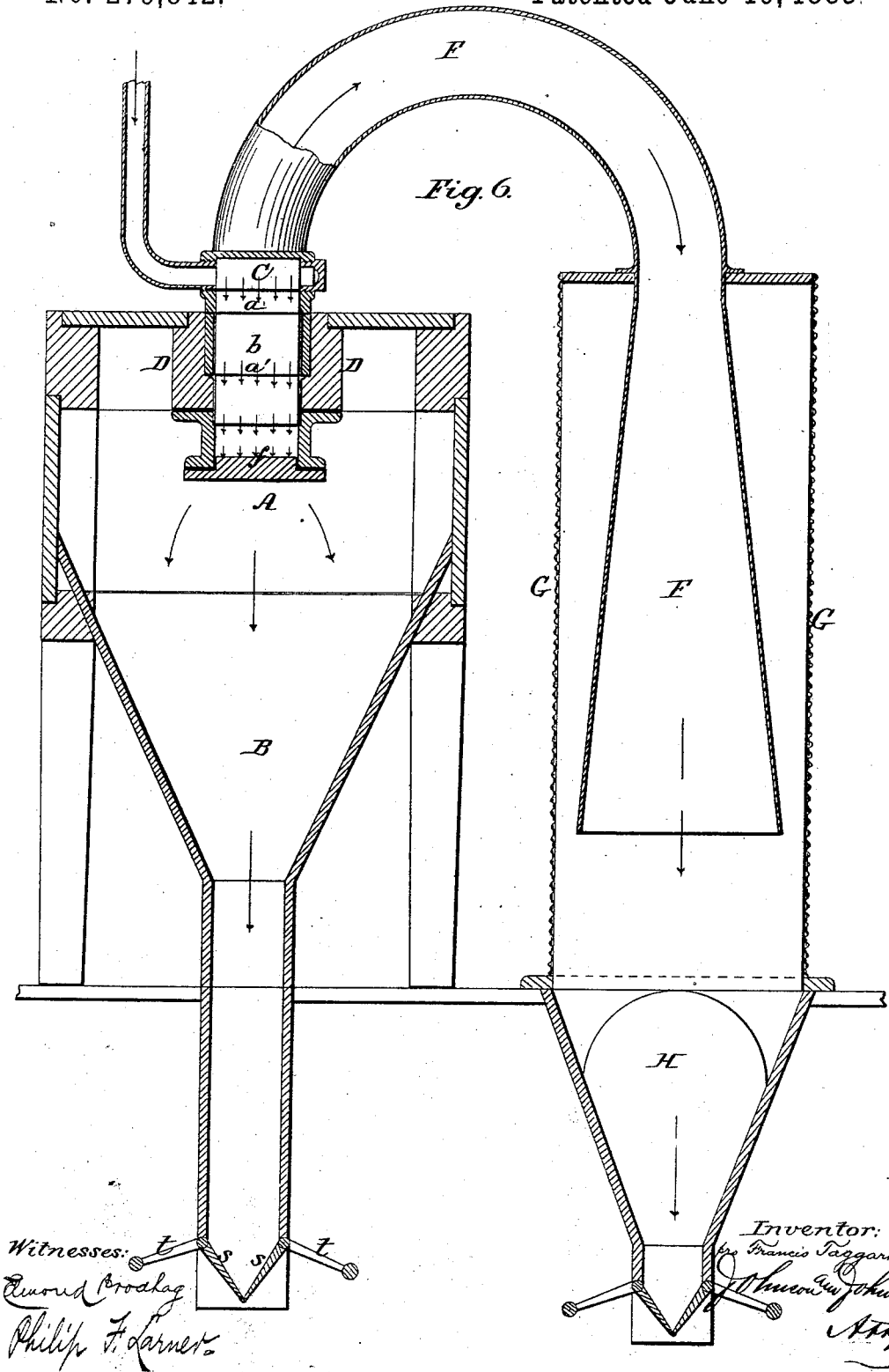

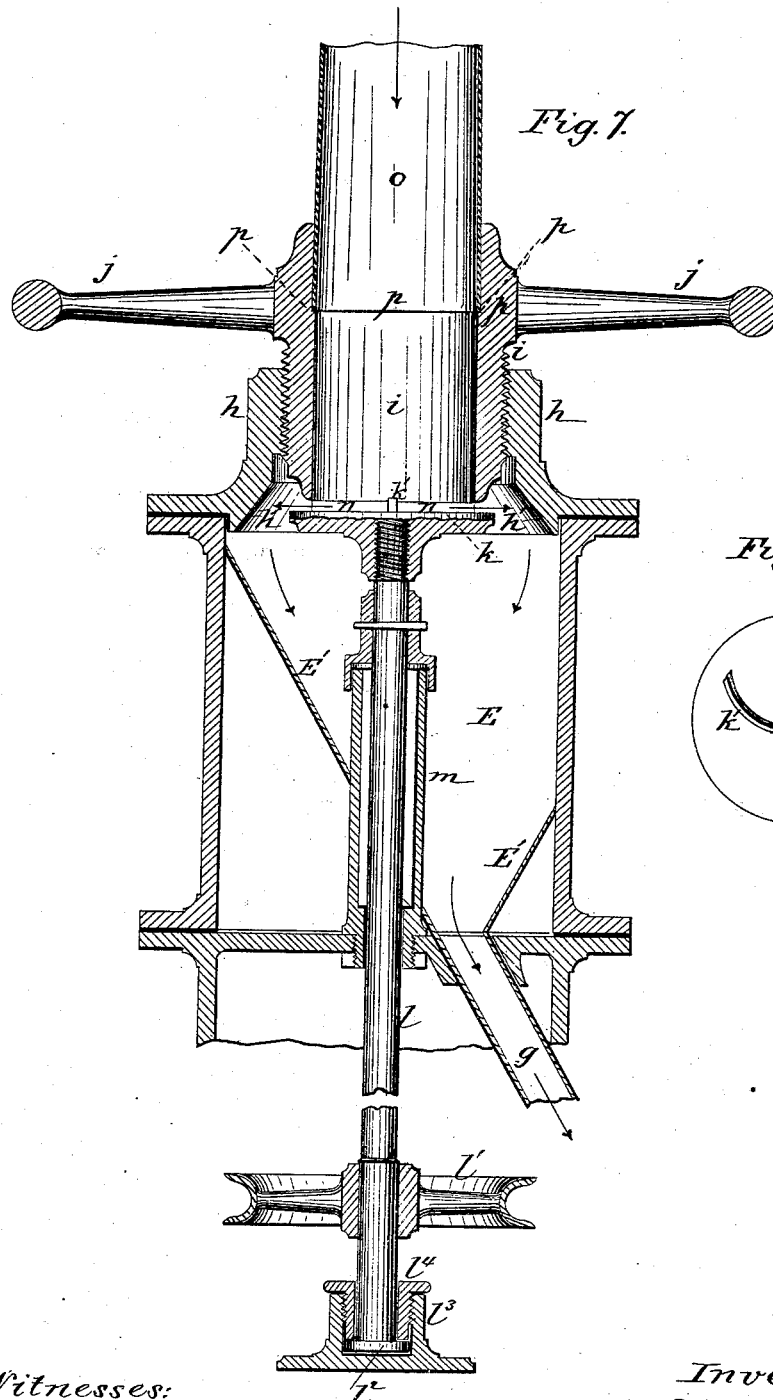

UNITED STATES PATENT OFFICE.

FRANCIS TAGGART, OF BROOKLYN, NEW YORK.

APPARATUS FOR DISINTEGRATING GRAIN, &c.

SPECIFICATION forming part of Letters Patent No. 279,842, dated June 19, 1883.

Application filed November 30, 1881. (No model.)

*To all whom it may concern:*

Be it known that I, FRANCIS TAGGART, a citizen of the United States, residing at Brooklyn, in the county of Kings and State of New York, have invented new and useful Improvements in Apparatus for Disintegrating Grain and other Frangible Substances, of which the following is a specification.

In a patent granted to me October 18, 1881, No. 248,528, I have described an apparatus and process for reducing frangible substances to particles and collecting the products, consisting in projecting the grains or granules with force against a hard abutment or obstacle by means of a continuous swiftly-flowing current of aeriform fluid under high pressure, into which the substance is introduced at a convenient point, whereby the latter is disintegrated, and then collecting the products, while the aeriform fluid is allowed to escape, leaving behind the lighter as well as the heavier products of the disintegration.

My present invention consists in matters of construction and of combination by which the utility and efficiency of the apparatus is enhanced in carrying out such process. As it is important to effect a regular and uniform feed to the ejector, I use in combination therewith a rotating disk feeding device for supplying the substance to be disintegrated in proper quantity continuously and unvaryingly to a chamber connected with the projecting device, while provision is made for the collection of the dust and for the separation of the light products of the disintegration from the outflowing air within a chamber independent of that in which the disintegration or comminution is effected. Provision is also made for adjusting the width of the ejector discharging-tube to suit the substance to be treated, and thus adapt the apparatus alike for the reduction of different-sized grain and for the reduction of ores.

The accompanying drawings illustrate one form of an apparatus in which my improvements are organized and arranged to carry the said process into effect, and in which—

Figure 4:
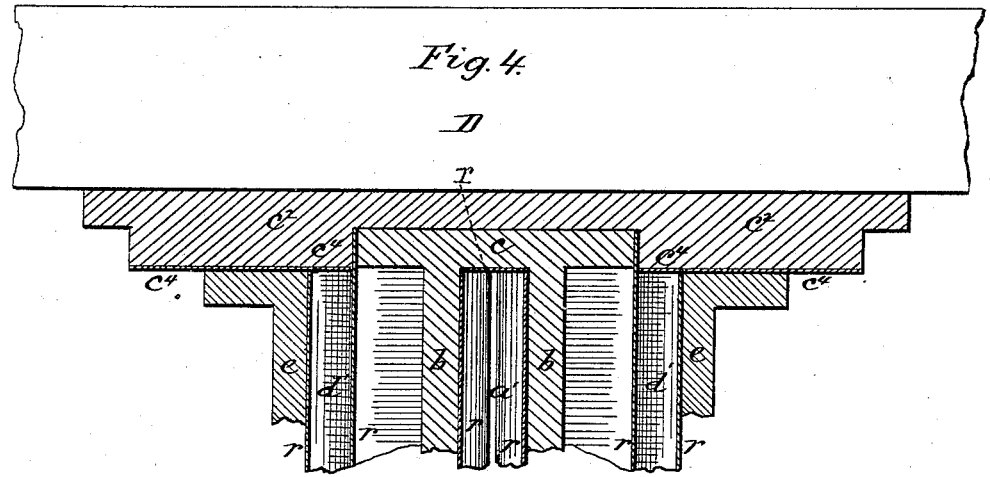
Figure 5:
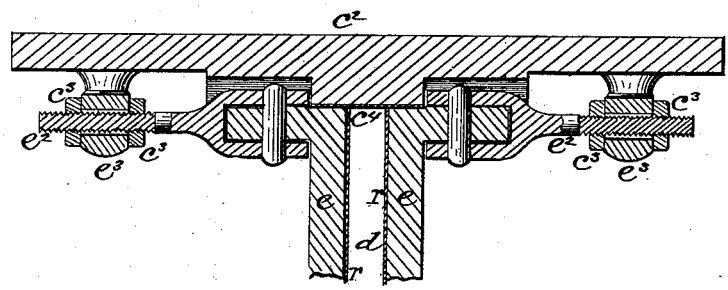

Figure 1 represents a vertical section of the apparatus embracing my improvements; Fig. 2, an enlarged vertical sectional view of the ejector device. Fig. 3 shows the ejector-orifice, looking at the orifice of the directing and discharging tube; Fig. 4, a partial horizontal sectional view of the same, taken on the line $x$ $x$ of Fig. 2; Fig. 5, a similar sectional view taken on the line 1 1 of Fig. 2; Fig. 6, a vertical section taken through the apparatus, showing the chamber in which the floating matter is separated from the spent air passing from the disintegrating-chamber; Fig. 7, an enlarged sectional view of the feeding device, and Fig. 8 the ribbed top surface of the feeding-disk.

The disintegration or comminution of the substance is effected in a practically-closed chamber, A, having a hoppered spout, B, for the discharge of the heavy portion of the products of the disintegration, while the lighter portion, rising with the air, passes out by an upwardly-discharging spout or spouts, and is conducted into a separating or dust-collecting chamber.

The ejector device and the abutment or surface against which the substance is projected are shown as depending within the chamber A from the top horizontal timbers, D, in which they are secured, while the feeding appliances and the chamber C, containing air under compression, are shown as mounted upon the top and outside of said chamber A, in proper relation to and in communication with the ejector-nozzles. The chamber C is supplied with air at a proper pressure by any suitable compressor, and its outlet $a$ is long and narrow and preferably in vertical line with the ejector, the sides $b$ $b$ of which are flat, forming a long and narrow orifice, $a'$, the dimensions of which are, say, two hundredths of an inch wide by six inches long, and from which orifice the air-jet is projected in a thin, wide sheet.

The ejector side plates, $b$ $b$, are preferably cast together with vertical end plates, $c$, Fig. 4, by which the ejector is bolted by screws $b'$ $b'$ to plates $c^2$, which are secured to timbers D, and also with horizontal top flanges, $c'$ $c'$, Fig. 2, by which the ejector is joined with corresponding flanges of the compressed-air chamber. A directing and discharging tube or chute, $d$, for the substance forms a continuation of the ejector, and also forms upward-diverging passages or chutes $d'$ $d'$ for the substance on each side of said ejector-orifice, the tube and the said passages being of rectangular form in cross-section.

The metal plates $e\ e$, which form the tube or chute $d$, are parallel to each other, or nearly so, from the rectangular discharge-orifice $a^2$ to a point near the ejector rectangular orifice $a'$, from which point the plates $e\ e$ diverge upwardly on each side of the ejector-orifice and form the feed-passages $d'\ d'$ to a central jet, which draws air and substance on both sides of the jet. These plates, when not adapted for adjustment, are bolted to the plates $c^2$ by flanges. In the drawings these upwardly-diverging plates $e\ e$ are shown as being pivoted at $e'$, at or near their upper ends, while their lower ends are rendered adjustable by screws $e^2\ e^2$, so as to increase or diminish the width of the discharging-tube orifice $a^2$, and thus adapt the apparatus for different-sized grains and for different substances. The screws $e^2\ e^2$ for this purpose are pivoted to that portion of the plates $e\ e$, which form the parallel sides of the discharging-tube $d$, and, passing through studs $e^3\ e^3$, projecting from a fixed end plate, $c^2$, are adjusted and set by lock-nuts $c^3$, as shown in Figs. 2 and 5. In such adjustment the tube-forming plates $e$ move in equal arcs toward or from each other without materially affecting the parallel relation of the tubular forming parts. The pivots $e'$ of these plates are formed in flanges, and the ends of the feed-passages $d'\ d'$ and of the tube-forming parts $d$ are closed by thin polished metal plates $c^4$, secured to the fixed plates $c^2$, to which the ejector-forming casting is also secured. These fixed plates $c^2$ are bolted in vertical positions to the timbers D, and between these plates the ejector-casting is secured, the closed ends of the latter being fitted in recesses in said plates, as shown in Fig. 4.

The interior surfaces of the ejector and of the directing and discharging tube or chute are lined with smooth plates $r$, of steel or other suitable metal, detachably secured in any suitable manner, whereby to obtain smooth surfaces in the small passages where it would be difficult to produce such surfaces in the castings. These linings afford facility for being renewed when worn out, and such renewal of the metallic walls, subjected to the action of the substance, is an important matter, and such parts as are subjected to wear are made removable to afford facility for such renewal of the worn surfaces.

In a long ejector-tube, such as that shown, it is important that the air should flow through it with the least friction in order not to diminish its projecting force. The rough surfaces of the casting described would produce such friction, and to a greater or less extent retard the flow of the air under compression, and hence I provide thin steel plates for giving smooth and polished walls to the ejector, that the air may flow with the least resistance. So, in like manner the substance should descend swiftly through the converging chutes or passages $d\ d'\ d'$, with the least friction and hinderance from rough surfaces, so as to present a contact with the air-jet as uniform as possible. Hence I provide thin steel plates for giving smooth and polished walls to the feed-passages back of the air-jet and to the discharging tube or chute which receives the air-jet and directs the substance upon the reducing-surface. Moreover, it must be observed that the flow of the air and the flow of the substance should be as free from resistance as possible, and that the force of the air-jet must co-operate with the feed of the substance by producing an entraining force of air in the feed-conduits—that is, a force inducing particles of substance to follow one after another in train—by the application of force to give swift motion to the foremost or first moving particle; and it is for this reason that the smooth thin polished surfaces of the steel plates in the ejector-tube and in the communicating conduits for the substance become important in the operation of projecting the substance upon the reducing-surface, so that each particle shall receive the same shattering action upon such surface. It is also important that these polished surfaces should be of plates sufficiently thin to be bent to conform to the bends or angles of the walls to which they are secured as linings.

The abutment $f$ is secured to the under sides of the timbers D by hangers in proper relation to the rectangular orifice $a^2$ of the directing and discharging tube or chute, from which the substance carried by the jet is projected against said abutment and has its velocity arrested and its momentum destroyed so instantaneously as to produce the required degree of disintegration.

It will be seen that, the directing and discharging tube or chute $d$ having its smallest dimensions as narrow as may be and allow the passage of the substance to be disintegrated, the grains or fragments of wheat or other substance being reduced impinging upon the abutment in a wide, thin sheet, its particles arranged along a single line, and the disintegrated substance having unobstructed liberty to disperse, there will be no retardment and accumulation of any portion of the substance upon the surface of impingement consequent upon the destruction or partial destruction of the momentum of the substance.

The abutment $f$ is preferably of hard metal and preferably has a narrow surface equal in length to the width of the projected sheet of the substance, and is placed a suitable distance from said directing-tube. The feed-passages $d'\ d'$ of this directing-tube converge to the ejector-orifice $a'$, and are prolonged by spouts or covered slides $g\ g$, to feed-chambers E E, which are supported on each side of the compressed-air chamber. The substance to be disintegrated descends by its gravity from the chamber E, and, with the air drawn with it, enters the swiftly-flowing jet at the ejector-orifice. The chamber E is preferably of square form in cross-section and provided with a cover having an upward extension, h, with an internal screw, into which is screwed a short tube, i, provided with a hand-wheel, j, so that it may be raised and lowered. The lower end of this short tube i opens into the chamber E, and its vertical adjustment within the cover h is in relation to a revolving disk, k, which forms the bottom of said adjustable tube i and feeds the material therefrom. This feeding-disk k has ribs k' on its top surface, and is carried upon the upper end of a vertical shaft, l, driven by a pulley, l', and supported in a step on the top of the chamber A, and a long sleeve-bearing, m, rising from the horizontal bottom of the chamber E.

The disk-shaft is provided with a collar, l², at its lower end, and its bearing-step l³ is formed with an interior screw to receive a screw-collar, l⁴, bearing upon the shaft-collar, and thus prevent the shaft from having any vertical movement, which would otherwise be liable, and therefore render the feed from the disk unreliable. The disk, by its rotary motion and by the surface-ribs shown in Fig. 8, serves to deliver by centrifugal action the substance to be disintegrated in a thin horizontal sheet through the annular space n, between the top surface of the disk k and the lower edge of the adjustable tube i, whence it falls into the chamber E and thence descends the spout or slide g and the feed-passage d' to the directing and discharging tube.

To prevent the accumulation of matter upon the walls of the chamber from the substance thrown off by the disk, the latter is preferably arranged within the bottom of the cover h, which presents inclined walls h' to receive the substance and direct it down into the chamber E, the inclined bottom E' of which forms a continuation of the upwardly-diverging spouts or slides g g, which are of rectangular form in cross-section, and preferably are of a width equal to the length of the ejector-nozzle and of the width of said chamber. The feeding of the substance into the adjustable tube i is effected by a vertical pipe, o, of light sheet metal, seated upon an annular shoulder, p, within said adjustable tube, and made smooth inside and a little larger at its lower end than at its top, so that the substance filling the pipe o will not choke and clog, but descend freely from the top to the lower end of said pipe. The upper end of this pipe slips freely over or inside of the lower end of a fixed pipe, (not shown,) into which the substance may be delivered by a screw-conveyer or otherwise, so that the pipe o is free to rise and fall with the hand-wheel tube. By turning the hand-wheel j in one direction its tube i will be caused to rise and leave a space, n, between it and the surface of the disk k, through which the substance to be disintegrated will be projected in a thin horizontal sheet by the action of the revolving disk. By turning the hand-wheel in the opposite direction the space will be lessened, and the feed can be thus regulated as may be required to suit the substance to be disintegrated and the force of the air-jet.

The disk has a diameter greater than the interior diameter of the adjustable tube, so that the latter can be screwed down upon the disk to cut off the feed entirely. The substance to be treated rests in a cylindrical column upon the surface of the revolving disk, by which it is thrown out in a manner to cause the exact supply of the substance to the jet. This exact supply is delivered from the disks into the chambers E, so that the latter are always free of the packed substance, and always insures a continuous and regulated flow of the substance to the ejector.

The heavy products of the disintegration fall from the abutment and descend into the spout B, which may be provided with valves s s, held closed by the weighted levers t t, and adapted to be opened by the weight of the disintegrated substance accumulated in the hopper to allow it to pass out, while the fine particles floating in the spent air will pass out by the top and into a pipe, F, or pipes, which enter and terminate in a dust collecting and separating chamber, G, or chambers. The walls of such chamber G are of woven fabric, such as will allow the air to pass, under slight pressure, out through the walls, while retaining within the chamber all or nearly all the products of disintegration. The pervious walls of this chamber are preferably of cylindrical form, closed at the top and opening at the bottom into a hopper, H, provided at the bottom with a spout and valves closed by weighted levers. This dust collecting and separating cylinder is suitably fastened at the bottom, and supported at its top by the connecting-pipe F, and its walls, being accessible at every point, may be cleaned by whipping or brushing to free the interior surface thereof from the fine products of disintegration which will accumulate upon them. In order, therefore, to effect such cleaning of the walls of the collecting and separating chamber, and keep them in proper condition for the passage of the air through them without interrupting the continuous operation of the apparatus, I provide a second dust collecting and separating chamber, so that the air and floating particles may pass from the chamber A to one or the other by valves F', arranged in the air-outlet pipes. By this means, while the communication is cut off from one of said chambers, the air and fine products may pass into the other; or both of said chambers may be used at the same time, if desired. If, however, it should not in any particular case be practicable to make the two dust collecting and separating chambers for alternate operation of sufficient capacity for the work, then other chambers of like construction may be used connectedly. The fine products thus separated from the air descend and pass out of the chamber G by the hopper H and the spout, which is provided with weighted valves in the same manner and for the same purpose as the valves in the discharge-spout of the disintegrating-chamber. That portion of the outlet-pipe F which enters the separating-chamber G extends to near the bottom of said chamber and flares downward, so as to give a free outlet and delivery of the spent air and the light products carried by it at or near the bottom of said separating-chamber, so that the particles may fall at once into the hopper, and the air rise along and be filtered through the walls of the chamber.

Instead of separating the light products from the outflowing air by chambers of pervious walls, such products escaping with the spent air may pass in any direction into a closed chamber or space having pervious walls and of sufficient capacity to allow the finely-disintegrated substance to subside, while the air will pass out through openings of such form and construction as to allow only the air to pass out, or as near to that as possible. The subsided light portions of the substance, and the coarser and heavier portions may be withdrawn and carried away from their respective chambers by screw-conveyers or other mechanical means.

The arrangement of the feeding devices and chambers so as to give an equal feed upon each side of the wide and narrow ejector-orifice is important in effecting a perfectly-regular feed of the material to each side of the jet, and in securing that a wide, thin sheet will be conducted equally into the passages $d'$ $d'$ on each side of the ejector, so that the substance fed into the chamber E in a thin sheet from the disk is delivered therefrom in a thin, wide sheet to the ejector, and projected against the abutment in a thin, wide sheet by the ejector, all combined to produce the most satisfactory results in giving to each grain or particle of ore or other substance the same shattering effect from the impact against the abutment by the use of compressed air.

In another application for a patent I have described and claimed a tube or chute for conducting and discharging the substance, having an orifice that is long and narrow, and a jet-mouth for the issuing current of air of corresponding form, and their combination with an abutment or surface of impact for the substance, and therefore do not herein claim such a thing.

I claim—

1. In apparatus for disintegrating grain and other frangible substances, the combination, substantially hereinbefore set forth, of an ejector and a chamber for compressed air, with passages or conduits for the substance converging to the nozzle of said ejector, and terminating in a tube or chute having parallel sides in line with said ejector, and an abutment, whereby the substance is fed from converging conduits to a central air-jet and projected in a line with said central jet.

2. The combination, in apparatus for disintegrating frangible substance, of an ejector and a chamber for compressed air, with a laterally-adjustable tube for the substance, means whereby to effect such adjustment, and an abutment, for the purpose specified.

3. In combination, the ejector, a chamber for compressed air, the pivoted plates $e$ $e$, the converging passages or conduits $d'$ $d'$, and the tube or chute $d$ for the substance, the adjusting-screws $e^2$ $e^2$, and an abutment, substantially as described, for the purpose specified.

4. The combination of an ejector having a long and narrow orifice, a chamber for compressed air, a tube or chute, $d$, having a long and narrow orifice, with passages or chutes $d'$ $d'$ for the substance, converging to the nozzle of said ejector, terminating in said tube or chute $d$, and an abutment, substantially as described, for the purpose specified.

5. The ejector, in combination with the tube or chute $d$ and the converging conduits $d'$ $d'$, lined with smooth plates of steel or other suitable metal, for the purpose specified.

6. An ejector the air-discharge tube of which is lined with thin plates of polished hard metal, for the purpose specified.

7. In combination with an air-ejector, a discharging tube or chute for the substance projected thereby, lined with thin plates of polished hard metal, substantially as described, for the purpose specified.

8. In apparatus for disintegrating frangible substances, an ejector having a long and narrow orifice, $a'$, a tube or chute, $d$, having a long and narrow passage, and orifice $a^2$, and a chamber for compressed air, having a long and narrow opening, $a$, in combination with the converging conduits $d'$ $d'$, adapted to deliver the substance on each side of a central air-jet, and an abutment, substantially as described.

9. The combination, substantially hereinbefore set forth, with an ejector, a chamber for compressed air, a supply-conduit, a tube or chute, $d$, in line with said ejector, and an abutment, of a feed device consisting of a revolving disk, $k$, and an adjustable tube, $i$, operating to deliver the substance into said conduits, to said ejector, and to said abutment with a positive, uniform, and regulated feed.

10. The combination, with the horizontal rotating disk $k$, the screw-cover $h$, the screw-tube $i$, having the hand-wheel $j$, and the chamber E, of the pipe O, increasing in diameter from its upper receiving to its lower end, and seated upon a shoulder within said tube $i$, substantially as described, for the purpose specified.

11. In combination with a supply-pipe and an air-ejector for reducing substances by impact, a horizontally-rotating feeding-disk, and a suitable conduit connecting the chamber thereof with said ejector, for the purpose described.

12. The apparatus herein set forth, (for reducing frangible substances by impact by the action of compressed air,) comprising a closed chamber, A, having a valved bottom, an air-ejector, and an abutment arranged within said chamber, suitable supply-conduits communicating with said ejector, a chamber, G, having pervious walls and an impervious valved bottom, and a downward-flaring pipe entering said pervious chamber and communicating with the said closed chamber, all constructed and arranged substantially as described, for the purpose specified.

In testimony whereof I have hereunto set my hand in the presence of two subscribing witnesses.

FRANCIS TAGGART.

Witnesses:
A. E. H. JOHNSON,
J. W. HAMILTON JOHNSON.